J. K. CHRISTOPHER.
HORSESHOE.

No. 108,684. Patented Oct. 25, 1870.

Witnesses.
C. A. Harkness
D. J. Brown

Inventor.
Jesse K. Christopher
By his Atty
P. D. Smith

United States Patent Office.

JESSE K. CHRISTOPHER, OF DAYTON, OHIO.

Letters Patent No. 108,684, dated October 25, 1870.

IMPROVEMENT IN HORSESHOES.

The Schedule referred to in these Letters Patent and making part of the same.

*To all whom it may concern:*

Be it known that I, JESSE K. CHRISTOPHER, of Dayton, in the county of Montgomery and State of Ohio, have invented a new and useful Improvement in Horseshoes; and I do hereby declare the following to be a full, clear, and exact description of the same, reference being had to the accompanying drawing, in which—

Figure 1:
Figure 1 represents, in perspective, the upper side of my horse-shoe.
Figure 2:
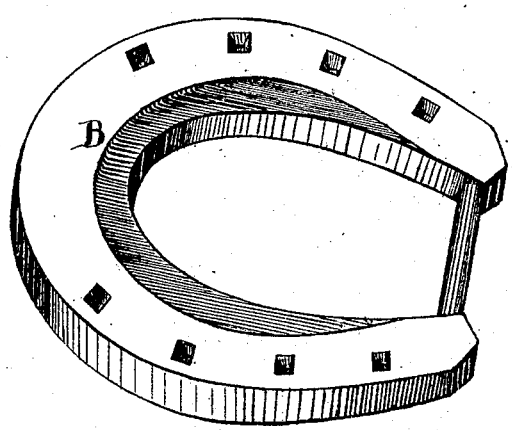
Figure 2 represents the lower surface or sole of my shoe.
Figure 3:
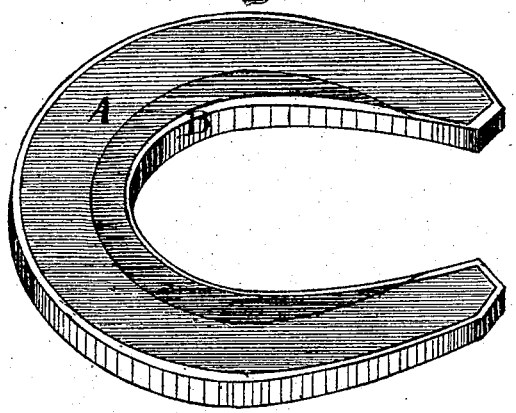
Figure 3 is a transverse section on line $x\,x$.

My invention is designed to relieve the horse from the shocks and concussions received in traveling on hard roads or pavements, and from the deleterious effects of cramping the hoof by securing it to an inflexible shoe; and It, therefore, consists of a horseshoe composed of an elastic and flexible material capable of conforming to the natural growth and form of the horse's hoof, and to be secured thereto in any well-known manner.

The use of iron shoes, rigidly attached to the hoof of the horse, is the source of many diseases of the foot and leg, and causes also many of the defects of gait to which that animal is subject.

Aside from the rigid and unnatural contraction of the hoof which results from its confinement to the limits of an iron shoe, the practice of farriers' in cutting and burning the hoof while fitting the shoe is cruel and in the highest degree injurious.

By the use of my invention the hoof will be permitted to grow and expand as nature intended it should do, and in fitting these shoes no cutting of the hoof will be required more than is necessary to remove the surplus growth of the edges as one trims his finger-nails.

I am aware that iron shoes have been made with joints at or near the toe, so as to permit a lateral expansion at the heel, but they cannot be beneficial because the hoof, in growing, expands in all directions, and such shoes only permit an expansion in one direction.

I am also aware that shoes have been made slightly elastic by the insertion of pieces of India rubber within the shoe; but, in those cases, the shoe itself has been rigid, and the elasticity was only intended to relieve the heel, and proved worthless when tested.

In my invention the entire shoe is elastic, and conforms to the inequalities of the hoof, and permits it to expand in any direction in obedience to the requirements of nature.

That others may more particularly understand its construction and operation I will describe it in detail.

Foundation pieces A, of cloth, felt, leather, or other suitable flexible but non-elastic material, are first cut in the form of a horse's shoe.

One of these foundation-pieces, together with the raw rubber or other vulcanizable elastic material B, properly packed in the mold, is then submitted to the vulcanizing action of heat.

When this vulcanizing process is completed, a shoe is formed, the sole of which is composed of dense elastic rubber or other similar substance, with a non-elastic foundation of cloth, felt, leather, or other suitable material, and said shoe may be secured to the horse's foot in the ordinary manner, i. e., by nails, screws, or other appliances.

The foundation-piece A is inserted for the purpose of preventing contact between the foot and the elastic vulcanized gum, to obviate any deleterious chemical effect upon the tissue of the hoof, to avoid friction between the hoof and shoe, as would ensue if the elastic surface of the latter should be in contact with the hoof, and to prevent any working of the nails or other fastenings in the shoe or hoof.

Different degrees of density and elasticity may be required to adapt my shoes to the purposes of the roadster, racer, or draft-horse.

The foundation A may also be made of hard vulcanized rubber instead of leather or fibrous material.

The application of devices to prevent slipping, I reserve for separate Letters Patent, and I also reserve for separate patent, the process of treating and curing rubber and other vulcanizable gums which I consider advantageous to employ in the manufacture of my invention.

Having described my invention,

What I claim as new is—

1. An elastic and flexible horseshoe, composed of "vulcanized" India-rubber, for the purpose set forth.

2. An elastic and flexible horseshoe, composed of "vulcanized" India-rubber, combined with a non-elastic foundation of leather, fibrous, or other suitable material, as and for the purpose set forth.

JESSE K. CHRISTOPHER.

Witnesses:
  J. T. PATTON,
  THOMAS TULLY.